United States Patent [19]
Ono et al.

[11] Patent Number: 5,268,689
[45] Date of Patent: Dec. 7, 1993

[54] MULTI-BAND MICROWAVE DETECTOR

[75] Inventors: Hisao Ono, Okazaki; Takeshi Hatasa, Toyota, both of Japan

[73] Assignee: Yupiteru Industries Co., Ltd., Tokyo, Japan

[21] Appl. No.: 25,632

[22] Filed: Mar. 2, 1993

[30] Foreign Application Priority Data

Mar. 6, 1992 [JP] Japan ................................. 4-049805

[51] Int. Cl.$^5$ .......................... G01S 7/40; H04B 17/00
[52] U.S. Cl. .................................. 342/20; 455/226.1; 455/228
[58] Field of Search ................ 342/20; 455/226, 227, 455/228, 315

[56] References Cited

U.S. PATENT DOCUMENTS

| | | | |
|---|---|---|---|
| 4,315,261 | 2/1982 | Mosher | 342/20 |
| 4,613,989 | 9/1986 | Fende et al. | 455/351 |
| 4,622,553 | 11/1986 | Baba et al. | 342/91 |
| 4,630,054 | 12/1986 | Martinson | 342/20 |
| 4,668,952 | 5/1987 | Imazeki et al. | 342/20 |
| 4,725,840 | 2/1988 | Orazietti | 342/20 |
| 4,954,828 | 9/1990 | Orr | 342/20 |
| 5,001,777 | 3/1991 | Liautaud | 455/227 |
| 5,049,885 | 9/1991 | Orr | 342/20 |
| 5,068,663 | 11/1991 | Valentine et al. | 342/20 |

*Primary Examiner*—John B. Sotomayor
*Attorney, Agent, or Firm*—Wenderoth, Lind & Ponack

[57] ABSTRACT

A multi-band microwave detector is designed for detecting microwaves of a plurality of target bands from a specific source and a reference band, which target band includes a specific target band. The multi-band microwave detector comprises a super heterodyne receiving means cyclically performing receiving operation of the microwaves in the target band and the reference band in time sharing manner, a signal discrimination means for discriminating reception outputs from the receiving means for respective bands for generating detecting signals representative of the results of discrimination, means responsive to a detecting signal indicative of detection of the received microwave of one of the target bands other than the specific target band for triggering an alarm, and means responsive to a detecting signal indicative of detection of the received microwave of the specific target band and to the detection signal indicative of detection of the received microwave of the reference band, for triggering the alarm only when the detecting signal indicative of detection of the received microwave of the specific target band is present under absence of the detection signal indicative of detection of the reference band.

8 Claims, 4 Drawing Sheets

MULTI-BAND MICROWAVE DETECTOR

BACKGROUND OF THE INVENTION

1. Field of the Invention

The present invention relates generally to a detector for detecting a microwave transmitted from a measuring equipment, such as a speed measuring radar or so forth. More specifically, the invention relates to a multi-band microwave detector which is capable of discriminating a microwave from a specific source from those from other sources.

2. Description of the Related Art

Multi-band microwave detectors, such as so-called radar detectors which are adapted to detect microwaves transmitted from radar type speed measurement equipments for alarming, have been known in the prior art. For example, U.S. Pat. No. 4,622,553, issued on November 1986 to Baba et al., U.S. Pat. No. 4,630,054, issued on Dec. 16, 1986 to Martinson, U.S. Pat. No. 4,954,828, issued on Sep. 4, 1990 to Orr disclose radar detectors of the type that the present invention is directed. In case of typical traffic monitoring radar type speed measuring equipment (hereinafter referred to as "radar") employs a microwave in a plurality of frequency bands, i.e. 10 GHz band (X band), 24 GHz band (K band) and 35 GHz band (Ka band). The known radar detectors receive the microwaves transmitted from the radar through a heterodyne type receiver circuit, such as a super-heterodyne receiver circuit or so forth. For widening receiving band range, a local oscillation frequency is swept. In addition, for assuring detection, sweeping of the band is temporarily stopped for a given period at every occurrence of reception of signal. In the known method of discrimination of the reception signal, a signal waveform of heterodyne reception characteristics within a signal detection period where sweeping is stopped, is divided into a period, in which the magnitude of signal is held higher than or equal to a given value and a period, in which the magnitude of the signal is held lower than the given value for performing discrimination on the basis of ratio of occurrence of respective periods, occurring positions or number of occurrence within reception period for respective bands. Since two frequencies are selected from a plurality of higher-order high harmonics including a dominant wave simultaneously transmitted from a single local oscillator for X band and K band local oscillation frequencies and used simultaneously for a frequency mixing, the sweeping of the band is performed adapting to either of X band or K band having wider target frequency band. On the other hand, another local oscillator is employed for Ka band local oscillation frequency. In detection, the frequency from the local oscillator for the X and K band local oscillation frequencies and the frequency from the local oscillator for the Ka band local oscillation frequency are selectively used. Namely, in the known microwave detector, the local oscillator for receiving means for X and K band, which is not switched in time series and the local oscillator for the Ka band are employed for switching in time sharing manner.

When the microwave in the targeted band is detected by the microwave detector set forth above, it is still not certain whether the received microwave is transmitted from a specific source to be detected or from other source. This fact serves as a limit of reliability of this type of microwave detector in practical use.

In general, the microwave detector has a mixer portion exposed in the vicinity of a throat opening portion of a horn antenna and a local oscillator for generating a microwave for frequency mixing within a shield box which is located inner side to the mixing portion. In the reason of construction set forth above, the microwave frequency is inherently emitted to a space and then received by the mixing portion. Therefore, it is inevitable to cause leakage of the microwave containing not only the dominant frequency but also higher-order high harmonic frequencies through the throat opening portion of the horn antenna. When a plurality of microwave detectors are used in relatively close proximity to each other, the microwave leaked from one microwave detector may be received by another microwave detector to cause erroneous alarm despite of the fact that the source of the received microwave is different from the targeted source. Such problem can be caused by the combination of the leaking microwave frequency from the local oscillator and the receiving band.

In particular, when the leaking microwave frequency is completely included in the frequency band of the microwave from the targeted source, it is not possible to discriminate such leaking microwave from another microwave detector from that from the targeted source, e.g. the radar by the conventional discrimination method, in which the signal processing based on the heterodyne reception characteristics is performed. Therefore, due to impossibility of discrimination between the microwaves from the targeted source and from another microwave detector, it is inherent to generate an alarm even when the microwave from another microwave detector is received. Otherwise, the microwave detector may not achieve the desired function. Furthermore, it is completely impossible in the prior art to avoid erroneous alarming due to the presence of the leaking microwave from another microwave detector when both microwaves from the targeted source and another microwave detector are present.

SUMMARY OF THE INVENTION

Therefore, it is an object of the present invention to provide a multi-band microwave detector which has an improved performance in discriminating microwaves from a targeted source and other sources.

In order to accomplish the above-mentioned and other objects, a multi-band microwave detector, according to one aspect of the present invention, for detecting microwaves of a plurality of target bands from at least a specific source and a reference band, which target band includes a specific target band, comprises:

a super heterodyne receiving means cyclically performing receiving operation of the microwaves in the target band and the reference band in time sharing manner;

a signal discrimination means for discriminating reception outputs from the receiving means for respective bands for generating detecting signals representative of the results of discrimination;

means responsive to a detecting signal indicative of detection of the received microwave of one of the target bands other than the specific target band for triggering an alarm; and means responsive to a detecting signal indicative of detection of the received microwave of the specific target band and to the detection signal indicative of detection of the received microwave of the reference band, for triggering the alarm only when the detecting signal indicative of detection of the received microwave of the specific target band is present under absence of the detection signal indicative of detection of the reference band.

In the construction set forth above, the microwave from the target source can be discriminated from the microwaves from other sources based on the difference of spectral characteristics.

According to another aspect of the invention, a multi-band microwave detector for detecting microwaves of a plurality of target bands from a specific source and a reference band, which target band includes a specific target band, comprises:

a super heterodyne receiving means cyclically performing receiving operation of the microwaves in the target band and the reference band in time sharing manner;

a signal discrimination means for discriminating reception outputs from the receiving means for respective bands for generating detecting signals representative of the results of discrimination;

means responsive to a detecting signal indicative of detection of the received microwave of one of the target bands other than the specific target band for triggering an alarm; and means responsive to a detecting signal indicative of detection of the received microwave of the specific target band and to the detection signal indicative of detection of the received microwave of the reference band, for switching a sensitivity level from a normal higher level to a lowered level to maintain the sensitivity level at the lowered level for a given period of time when both of detecting signals indicative of detection of the received microwave of the specific target band and indicative of detection of the received microwave of the reference band are present, and for triggering the alarm only when the detecting signal indicative of detection of the received microwave of the specific target band is present under absence of the detection signal indicative of detection of the reference band and when the detecting signal indicative of detection of the received microwave of the specific target band is present while the sensitivity level is maintained at the lowered level.

In the above-mentioned construction, discrimination of the microwave from the target source from those of other sources can be made based on not only the difference of the spectral characteristics but also a difference of the level of the received microwaves.

In either case, the super heterodyne receiving means may comprise a double super heterodyne circuit for receiving the target bands and means for disabling parts of a local oscillator and a frequency mixer in the double super heterodyne circuit for operation as a single super heterodyne circuit for receiving the reference band. Such construction may be established by addition of small circuit, such as a bypass circuit and switches, to contribute for minimizing increasing of cost and size due to increasing of parts and for simplification of designing and manufacturing.

According to a further aspect of the invention, in a multi-band microwave detector system for detecting microwaves from a target microwave source which transmit a microwave having one of a plurality of specific band of frequencies which includes at least a first microwave band range and a second microwave band range distinct from the first microwave band range, and the multi-band microwave detector including local oscillator means generating a microwave having a specific dominant frequency range, a discrimination system for discriminating the microwave from the target microwave source from microwaves leaking from other multi-band microwave detector, comprises:

super heterodyne receiver means active in time sharing basis for receiving microwaves within a predetermined frequency range including the first and second microwave band ranges and the dominant frequency range;

detector means receiving reception signal from the super heterodyne receiver means for generating a first detector signal when reception of the microwave within the first microwave band range is detected, a second detector signal when reception of the microwave within the second microwave band range is detected and a third detector signal when reception of the microwave within the dominant frequency range is detected; and discriminating means responsive the first, second and third detector signals for generating a target detection signal when the first detector signal is detected or when the second detector signal is present while the third detector signal is absent.

In this case, the system may further comprise a sensitivity level adjusting means for adjusting sensitivity level for detection of the microwave within the second microwave band range between a higher level and a lower level, and the discriminating means is responsive to the second detector signal generated at the lower sensitivity level to produce the target detection signal irrespective of the third detection signal. In the preferred construction, the sensitivity level adjusting means normally sets the sensitivity level at the higher level and switches the sensitivity level into the lower level when the second and third detector signals are present simultaneously.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention but are for explanation and understanding only.

In the drawings.

DESCRIPTION OF THE PREFERRED EMBODIMENT

Figure 1:
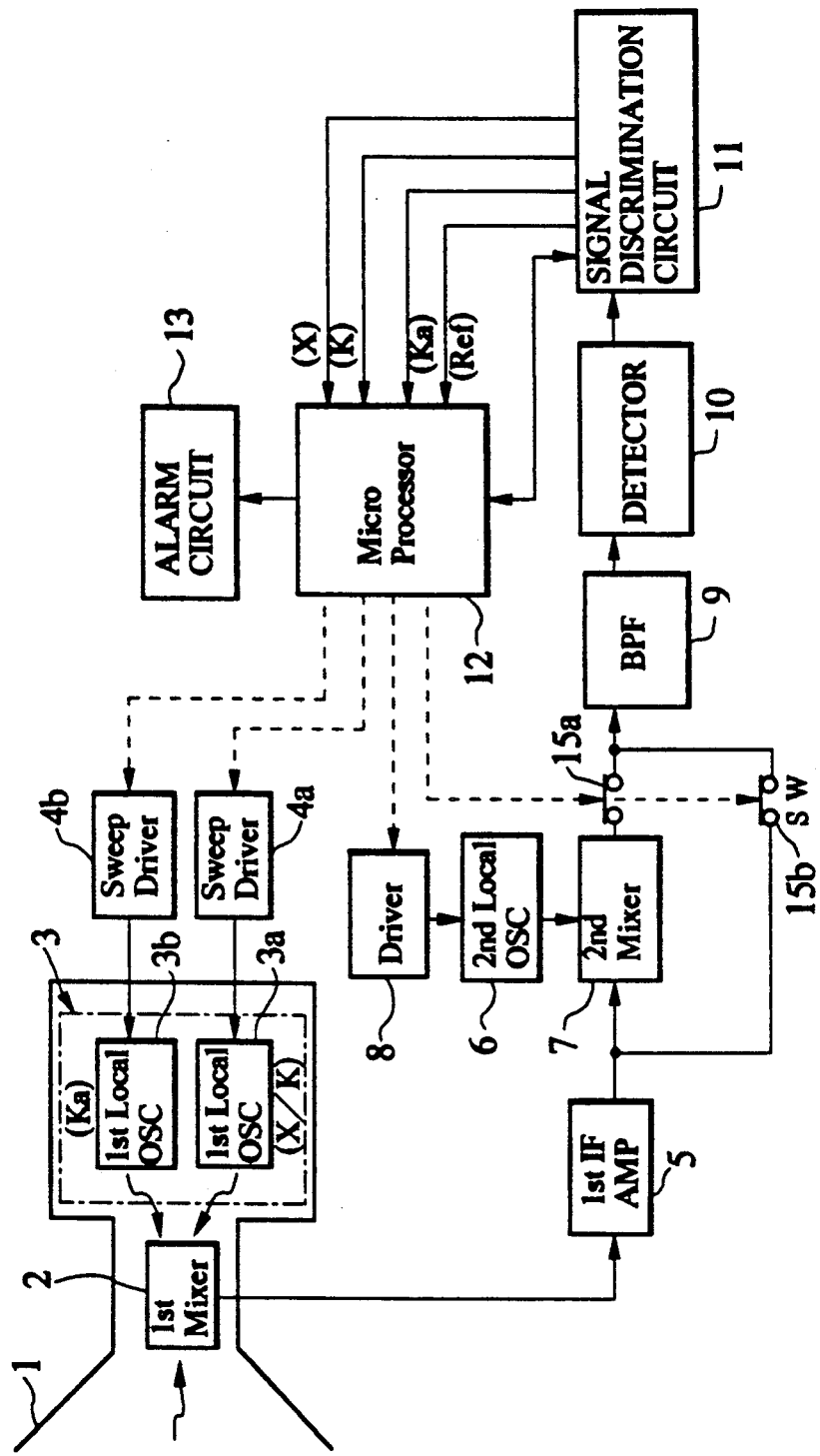
FIG. 1 is a block diagram of the preferred embodiment of a multi-band microwave detector according to the present invention.
Figure 2:
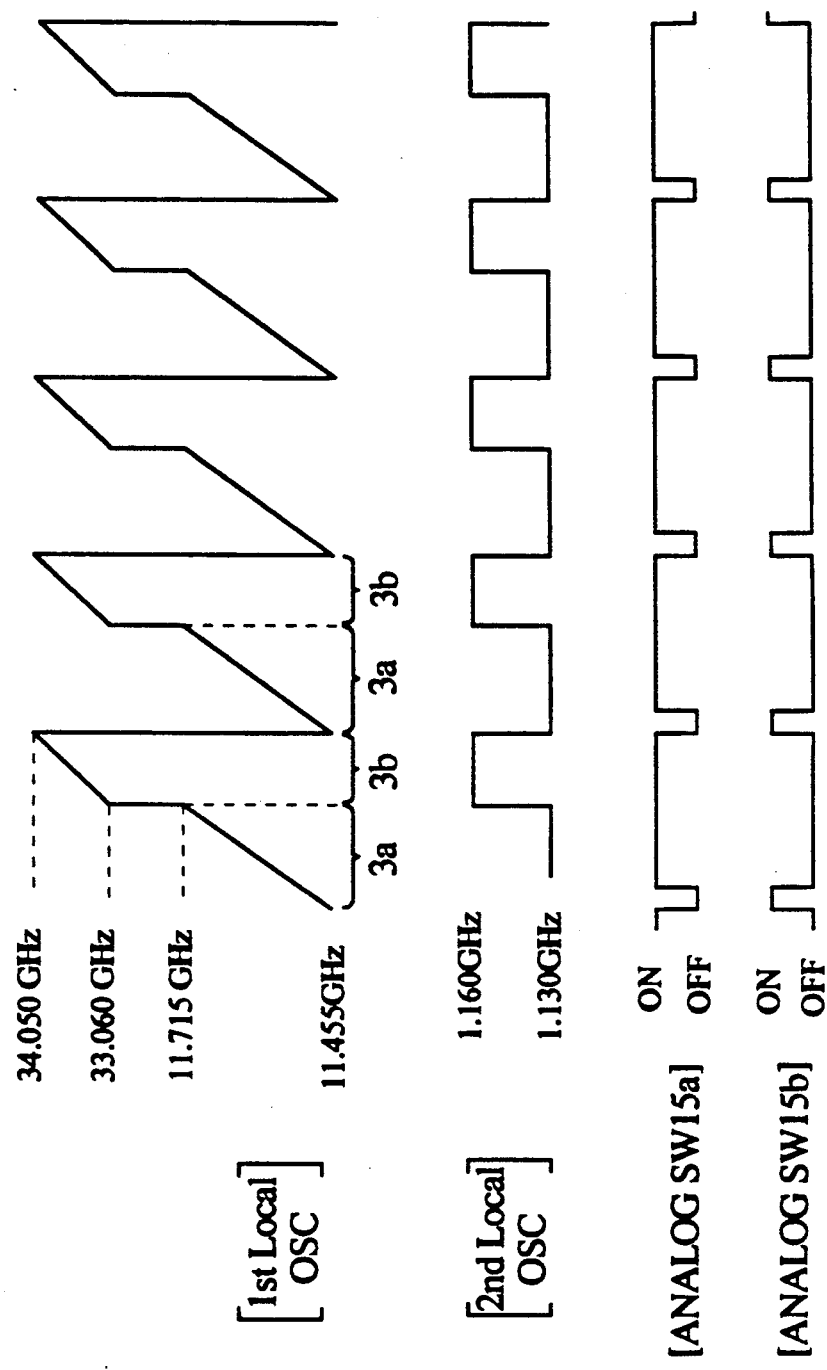
FIG. 2 is a timing chart showing operation of a super heterodyne receiving portion in the preferred embodiment of the multi-band microwave detector of FIG. 1.

Referring now to the drawings, particularly to FIGS. 1 and 2, the fundamental construction of the preferred embodiment of a multi-band microwave detector, according to the present invention, is will be discussed herebelow. For the purpose of illustration, the shown multi-band microwave detector is adapted to repeatedly receive 3 target band microwaves, i.e. X band (10.475~10.575 GHz), K band (24.050~24.250 GHz) and Ka band (34.200~35.300 GHz), and in addition, one reference band (11.428~11.688 GHz), in time sharing manner.

In FIG. 1, an externally transmitted microwave is received by a horn antenna 1. The received microwave is subject to a frequency mixing with microwaves from first local oscillators 3 in a first mixer 2. As the first local oscillators 3, an oscillator 3a for the X, K and reference bands and another oscillator 3b for the Ka band. The oscillators 3a and 3b are alternatively driven for oscillation by sweep drivers 4a and 4b. As shown in FIG. 2, the output frequency of the oscillator 3a is swept in a frequency range of 11.455~11.715 GHz by the sweep driver 4a. Subsequently, the output frequency of the oscillator 3b is swept in a frequency range of 33.060~34.050 GHz. The sweep operation is repeated periodically with a given period. A dominant wave of the oscillator 3a is used for receiving the X band and the reference band. A secondary harmonic wave of the oscillator 3a is used for receiving the K band. On the other hand, the output of the oscillator 3b is used for receiving the Ka band.

A first intermediate frequency signal output from the first mixer 2 is input to a second mixer 7 via an amplifier 5. An output frequency of a second local oscillator 6 is switched in synchronism with switching of the first local oscillators 3 by a driver 8. Namely, as shown in FIG. 2, the output frequency of the second local oscillator 6 is held at 1.130 GHz while the first local oscillator 3a is active, and at 1.160 GHz while the first local oscillator 3b is active. Switching the sweeping operation of the first local oscillators 3 and switching of the frequency of the second local oscillator 6 is controlled by a timing control performed by a microprocessor 12.

A second intermediate frequency signal output from the second mixer 7 is input to a detector 10 through an analog switch 15a and a band-pass filter A detected output of the detector 10 is input to a signal discrimination circuit 11.

On the other hand, the output of the amplifier 5 amplifying the first intermediate frequency is also input to the band-pass filter 8 through an analog switch 15b. As shown in FIG. 2, two analog switches 15a and 15b are complementarily switched ON and OFF by the microprocessor 12. While the analog switch 15a is held ON and the analog switch 15h is held OFF, the second intermediate frequency signal is input to the band-pass filter. At this operational state, receiving operation for the X , K and Ka bands is performed.

For a substantially short given period immediately after the first local oscillator 3a initiate operation and the output frequency of the second local oscillator 6 is switched at 1.130 GHz, the analog switch 15a is held OFF and the analog switch 15b is held ON. During this period, the second intermediate frequency signal from the second mixer 7 is ignored and the amplified first intermediate frequency signal from the amplifier 5 is input to the band-pass filter 9. This operating condition is for receiving the reference band.

The three target bands (X, K and Ka bands) are received by double super heterodyne system and one reference band is received by a single super heterodyne system. These receiving operations are periodically performed with the given period.

The signal discrimination circuit 11 receives detected reception signal at each band from the detector 10. The signal discrimination circuit 11 makes judgement whether a reception signal is present during a period assigned for each band to supply a detecting signal for each band to the microprocessor 12.

The microprocessor 12 checks detecting signals of the signal discrimination circuit 11 for respective bands at each cycle of receiving operation for four bands. The microprocessor 12 operates an alarm circuit 13 in the manner set out below. The alarm circuit 13 is designed to generate visual and audible alarms by turning ON a LED indicators or so forth and/or triggering a buzzer or so forth.

In the multi-band microwave detector adapted to the above-mentioned frequency ranges, the output of the first local oscillator 3a may contain a tertiary high harmonic component within the frequency range of Ka band as one of the target bands. Accordingly, when a plurality of multi-band microwave detectors of the shown type are used in the close proximity to each other, a microwave leaked from one of the microwave detector may cause a Ka band detecting signal in another microwave detector despite of the fact that the leaking microwave is not transmitted from a targeted source. In such case, the dominant frequency of the leaking microwave is in the vicinity of 11.5 GHz (corresponding to the dominant frequency of the first local oscillator 3). The reference band is set in the range of 11.428~11.688 GHz adapting to the dominant frequency of the leaking microwave. Conversely, in case of the Ka band microwave transmitted from the radar, the microwave should exclusively contain the components falling within the Ka band and does not contain the component falling within the reference band. Therefore, a spectrum component of the microwave from the radar as the targeted source of the microwave to be detected is distinct to that of the microwave from another source, such as another microwave detector. Therefore, even when Ka band detecting signal is present, it is highly possible that the received microwave is not transmitted from the targeted source, e.g. the radar, when the reference band detecting signal is present simultaneously.

The present invention proposes discrimination of the microwave from the targeted source from those from other sources utilizing this fact.

Figure 3:
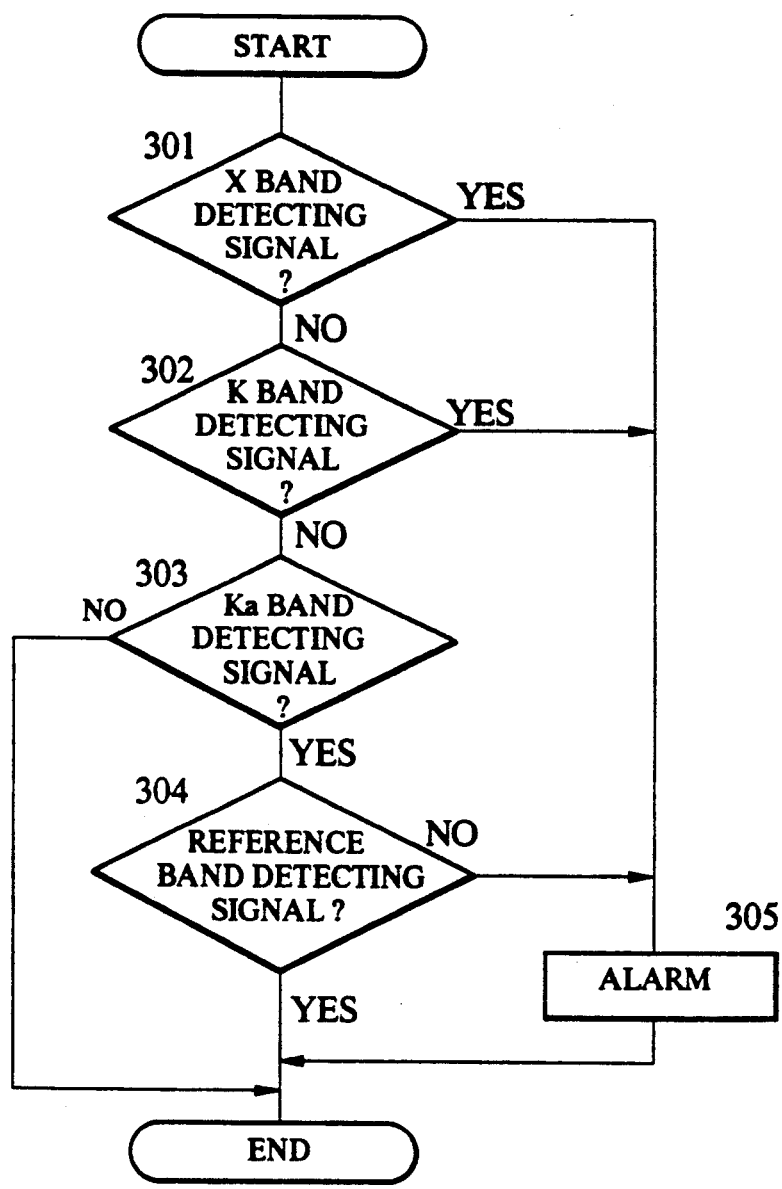
FIG. 3 is a flowchart showing a preferred process of an alarm control operation to be performed by the preferred embodiment of the multi-band microwave detector of FIG. 1.

FIG. 3 shows a process of an alarm control operation to be performed by the microprocessor 12 in the preferred embodiment of the multi-band microwave detector according to the present invention.

As shown in the flowchart of FIG. 3, at every cycle of receiving operation for respective bands, check is made whether a X band detecting signal or a K band detecting signal is present (steps 301 and 302). If either the X band detecting signal or the K band detecting signal is present, a process in a step 305 is performed for activating the alarm circuit 13 for generating an alarm.

On the other hand, when neither of the X band detecting signal and the K band detecting signal is present, check is performed whether the Ka band detecting signal is present (step 303). If the Ka band detecting signal is not present, the process goes END. On the other hand, when the Ka band detecting signal is present, check is performed whether the reference signal detecting signal is present (step 304). Then, if the Ka band detecting signal is present and the reference band detecting signal is not present, the process goes to the step 305 to generate the alarm, and otherwise the process goes END.

It should be noted that although the shown process simply ignores the Ka band detecting signal when the reference band detecting signal is simultaneously present, it may be possible to switch an alarm mode so that an alarm can be generated at an alarm mode different from a normal alarm mode when both of the Ka band detecting signal and the reference band detecting signal are present. For example, in the alarm mode when both of the Ka band detecting signal and the reference band detecting signal are present, a color of the LED indicator may be differentiated from that in the normal alarm mode, and/or, a sound of the buzzer may be differentiated from that in the normal alarm mode.

Figure 4:
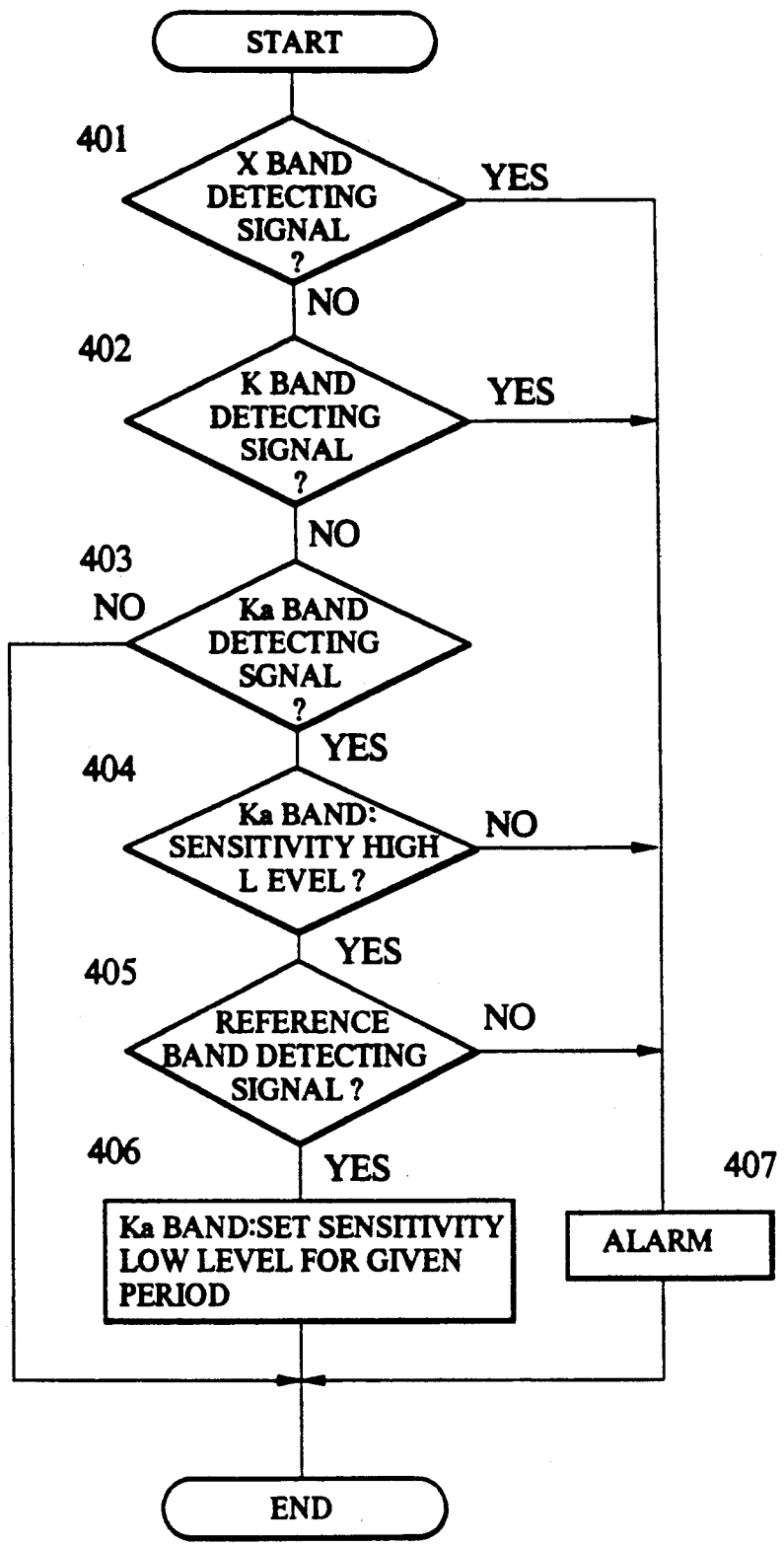
FIG. 4 is a flowchart showing another preferred process of an alarm control operation to be performed by the preferred embodiment of the multi-band microwave detector of FIG. 1.

FIG. 4 shows another preferred process of the alarm control operation to be performed by the preferred embodiment of the multi-band microwave detector according to the present invention. The shown process is proposed based on the fact that the microwave from the targeted source has higher signal level than that of the microwave leaking from other microwave detector. In the shown case, the microprocessor 12 is provided with a function for switching sensitivity level for the Ka band between a high level and a low level. In this case, the microprocessor 12 normally maintains the sensitivity level for the Ka band at high level and switches into the low level for a given period of time when a predetermined condition which will be discussed herebelow, is satisfied.

The process shown in the flowchart of FIG. 4 is triggered every one cycle of receiving operation for respective bands. Similarly to the process in FIG. 3, when the X band detecting signal or the K band detecting signal is present as checked at a step 401 or 402, the process goes to a step 407 to activate the alarm circuit 13.

When neither of the X band detecting signal and the K band detecting signal is present, check is performed whether the Ka band detecting signal is present or not, at a step 403. If the Ka band detecting signal is not present, the process goes END. On the other hand, when the Ka band detecting signal is present, the sensitivity level for the Ka band is checked whether it is set at high level at a step 404. If the sensitivity level is high level as checked at the step 404, the process is advanced to a step 405, in which check is performed whether the reference band detecting signal is present. When the reference band detecting signal is not present, the process goes to the step 407 to generate the alarm. On the other hand, if the reference band detecting signal is present as checked at the step 405, then the process is advanced to a step 406, in which the sensitivity level of the signal discrimination circuit 11 for the Ka band is set at the low level for the given period of time. It should be noted that the sensitivity level may be automatically returned to the high level after elapsing of the given period of time. When the Ka band detecting signal is present while the sensitivity level is maintained at the low level resulting in negative result at the step 404, then the process goes to the step 407 for generating the alarm.

It should be noted that it is possible to construct the circuit for receiving the reference band with maintaining double super heterodyne system by switching the output frequencies of the second local oscillator. Namely, in this case, part of the local oscillator and the frequency mixer in the double heterodyne circuit are switched into inoperative so that the circuit may serve as a single super heterodyne circuit for receiving the reference band.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

For instance, the present invention is applicable for the microwave detectors disclosed in the commonly owned co-pending U.S. Patent Applications, respectively entitled "Power Saving Type Multi-Band Microwave Detector", "Structure of Reception Frequency Converting Portion in a Multi-Band Microwave Detector" and "Structure of Multi-Band Microwave Detector", all have been filed on the same date to the present invention. Disclosures of the above-identified copending U.S. Patent Applications are herein incorporated by reference.

What is claimed is:

1. A multi-band microwave detector for detecting microwaves of a plurality of target bands from at least a specific source and a reference band, which target band includes a specific target band, comprising:
   a super heterodyne receiving means cyclically performing receiving operation of said microwaves in said target band and said reference band in time sharing manner;
   a signal discrimination means for discriminating reception outputs from said receiving means for respective bands for generating detecting signals representative of the results of discrimination;
   means responsive to a detecting signal indicative of detection of the received microwave of one of said target bands other than said specific target band for triggering an alarm; and
   means responsive to a detecting signal indicative of detection of the received microwave of said specific target band and to said detection signal indicative of detection of the received microwave of said reference band, for triggering the alarm only when said detecting signal indicative of detection of the received microwave of said specific target band is present under absence of the detection signal indicative of detection of the reference band.

2. A multi-band microwave detector for detecting microwaves of a plurality of target bands from a specific source and a reference band, which target band includes a specific target band, comprising:
   a super heterodyne receiving means cyclically performing receiving operation of said microwaves in said target band and said reference band in time sharing manner;
   a signal discrimination means for discriminating reception outputs from said receiving means for respective bands for generating detecting signals representative of the results of discrimination;
   means responsive to a detecting signal indicative of detection of the received microwave of one of said target bands other than said specific target band for triggering an alarm; and means responsive to a detecting signal indicative of detection of the received microwave of said specific target band and to said detection signal indicative of detection of the received microwave of said reference band, for switching a sensitivity level from a normal higher level to a lowered level to maintain the sensitivity level at said lowered level for a given period of time when both of detecting signals indicative of detection of the received microwave of said specific target band and indicative of detection of the received microwave of said reference band are present, and for triggering the alarm only when said detecting signal indicative of detection of the received microwave of said specific target band is present under absence of the detection signal indicative of detection of the reference band and when said detecting signal indicative of detection of the received microwave of said specific target band is present while the sensitivity level is maintained at said lowered level.

3. A multi-band microwave detector as set forth in claim 1 wherein said super heterodyne receiving means comprises a double super heterodyne circuit for receiving said target bands and means for disabling parts of a local oscillator and a frequency mixer in said double super heterodyne circuit for operation as a single super heterodyne circuit for receiving said reference band.

4. A multi-band microwave detector as set forth in claim 2, wherein said super heterodyne receiving means comprises a double super heterodyne circuit for receiving said target bands and means for disabling parts of a local oscillator and a frequency mixer in said double super heterodyne circuit for operation as a single super heterodyne circuit for receiving said reference band.

5. In a multi-band microwave detector system for detecting microwaves from a target microwave source which transmit a microwave having one of a plurality of specific band of frequencies which includes at least a first microwave band range and a second microwave band range distinct from said first microwave band range, and said multi-band microwave detector including local oscillator means generating a microwave having a specific dominant frequency range, a discrimination system for discriminating the microwave from said target microwave source from microwaves leaking from other multi-band microwave detector, comprising:

super heterodyne receiver means active in time sharing basis for receiving microwaves within a predetermined frequency range including said first and second microwave band ranges and said dominant frequency range;

detector means receiving reception signal from said super heterodyne receiver means for generating a first detector signal when reception of the microwave within said first microwave band range is detected, a second detector signal when reception of the microwave within said second microwave band range is detected and a third detector signal when reception of the microwave within said dominant frequency range is detected; and discriminating means responsive said first, second and third detector signals for generating a target detection signal when said first detector signal is detected or when said second detector signal is present while said third detector signal is absent.

6. A system as set forth in claim 5, which further comprise a sensitivity level adjusting means for adjusting sensitivity level for detection of the microwave within said second microwave band range between a higher level and a lower level, and said discriminating means is responsive to said second detector signal generated at the lower sensitivity level to produce said target detection signal irrespective of said third detection signal.

7. A system as set forth in claim 6, wherein said sensitivity level adjusting means normally sets said sensitivity level at said higher level and switches the sensitivity level into said lower level when said second and third detector signals are present simultaneously.

8. A system as set forth in claim 5, wherein said first microwave band range is a K band and/or X band, and said second microwave band range is a Ka band.

* * * * *